United States Patent [19]

Blanc

[11] Patent Number: 4,557,554
[45] Date of Patent: Dec. 10, 1985

[54] LIGHT PROJECTORS

[75] Inventor: Ernst Blanc, Oberderdingen/Gross Villars, Fed. Rep. of Germany

[73] Assignee: Richard Wolf GmbH, Fed. Rep. of Germany

[21] Appl. No.: 540,797

[22] Filed: Oct. 11, 1983

[30] Foreign Application Priority Data

Oct. 12, 1982 [EP] European Pat. Off. ........ 82109422.4

[51] Int. Cl.$^4$ .......................... G02B 7/26; F21V 29/00
[52] U.S. Cl. .............................. 350/96.20; 350/96.10; 362/32
[58] Field of Search ............... 350/96.10, 96.15, 96.18, 350/96.20, 96.21, 96.22; 362/32; 250/227, 239, 522.1

[56] References Cited

U.S. PATENT DOCUMENTS

| 3,538,321 | 11/1970 | Longenecker et al. | 350/96.10 X |
| 3,683,167 | 8/1972 | Rishton | 350/96.20 X |
| 3,778,167 | 12/1973 | Claret et al. | 356/237 X |
| 4,241,382 | 12/1980 | Daniel | 362/32 |
| 4,362,360 | 12/1982 | Mannschke | 350/96.20 |

FOREIGN PATENT DOCUMENTS

| 56-59212 | 5/1981 | Japan | 350/96.20 |
| 56-107206 | 8/1981 | Japan | 350/96.20 |

Primary Examiner—John Lee
Attorney, Agent, or Firm—Hill, Van Santen, Steadman & Simpson

[57] ABSTRACT

This invention relates to a light projector comprising a shutter in front of a connector socket arranged to receive the plug of an optical fiber cable insertable thereinto, and the proximal end of the plug adjacent the projector is reduced in diameter and surrounded by a heat conductor. The invention consists in that the cable plug inserted into the connector socket installed in an annular mounting and secured in its inserted position, is enflanked at its diametrically reduced extremity by several, advantageously three, cooling jaws in the form of cylindrical annular segments in a radially inwardly spring-loaded manner, which may be thrust against a spring system at an axial distance from the connector socket and its ring mounting by means of a step of a thicker section of the plug coming into contact with shoulders of the cooling jaws. The shutter of the projector may be swung out of its beam path only once the plug of the light conducting optical fiber cable has been inserted into the connector socket.

16 Claims, 8 Drawing Figures

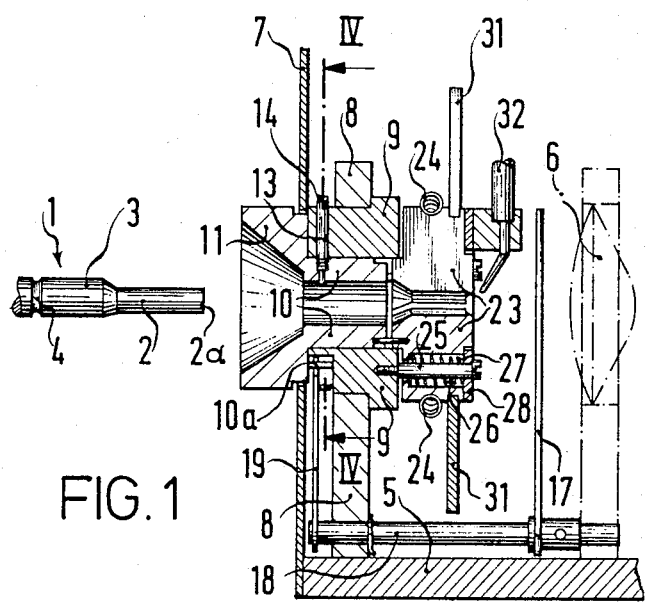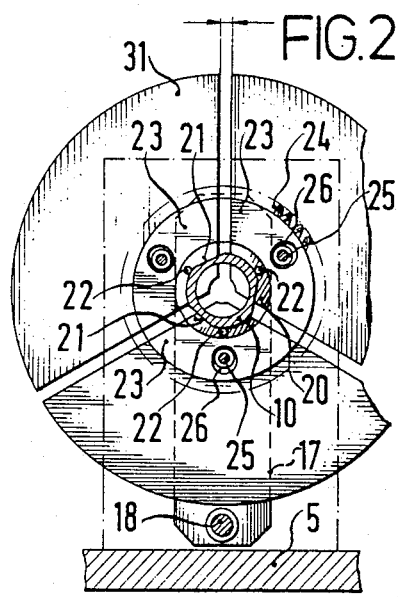
FIG. 1
FIG. 2
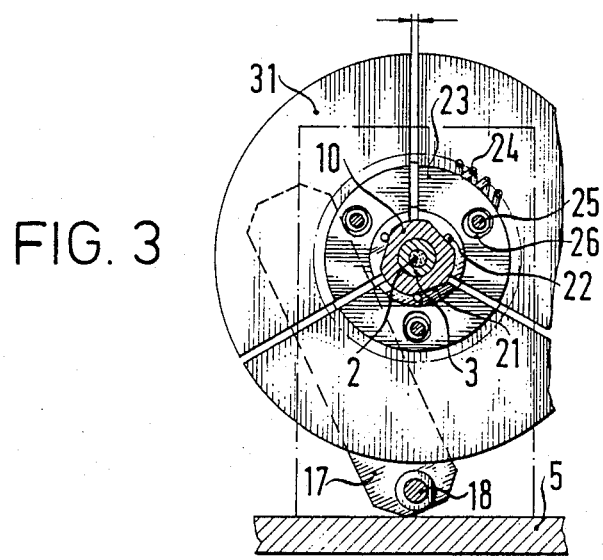
FIG. 3
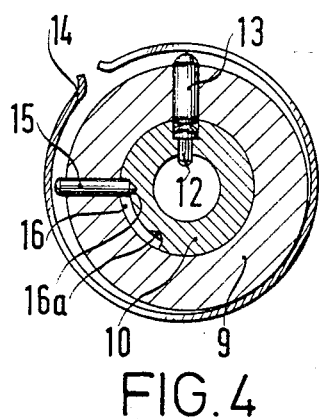
FIG. 4
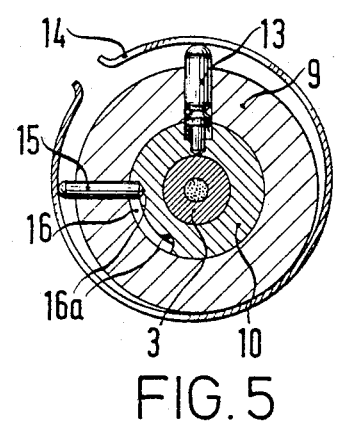
FIG. 5
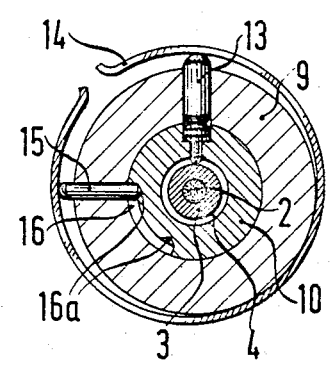
FIG. 6

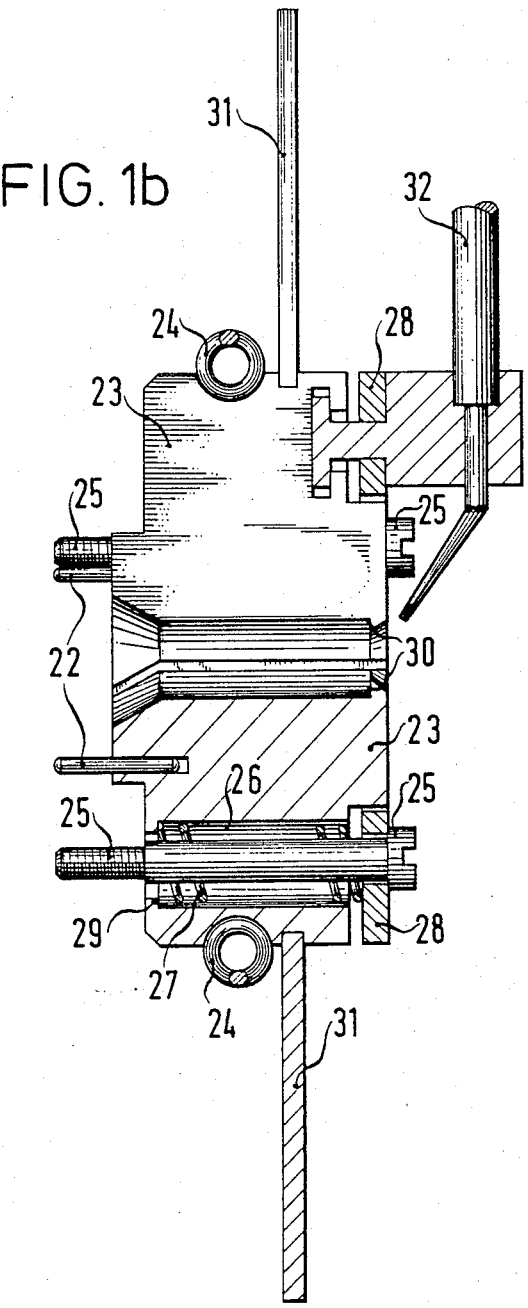

LIGHT PROJECTORS

BACKGROUND OF THE INVENTION

The present invention relates to light projectors of the kind comprising a condenser system and a shutter in front of a connector socket arranged to receive the plug of an optical fiber cable insertible thereinto, the proximal end of which plug adjacent the projector is reduced in diameter and surrounded by a heat conductor.

Optical fibers are joined together into a bundle and indissolubly coupled by means of a glass adhesive, for connection to a light projector. The fibers immobilized in the plug in this manner terminate at the proximal end facing towards the light projector with the end face of the diametrically reduced plug section. If the light beam of a light projector is then beamed into the end face of an optical fiber cable of this kind, this leads to partially substantial heating of the plug as a function of the output of the light projector. Since optical fiber cables are utilized with a thick as well as thin fiber bundle cross-section, it is necessary to perform the focussing of the light beam by means of a condenser system on comparatively narrow fiber bundle cross-sections to be able to emit a maximum light output. Since light conducting cables having a comparatively large fiber bundle cross-section undergo a very rapid temperature rise due to the low radially outwardly directed heat dissipation of the glass fiber, particularly in the area of the end light incidence, this results in a complementary rise in temperature caused by ultraviolet radiation of the projector light, because of the high heat absorption of the adhesive or bonder. The glass bonder present between the glass fibers of the plug is thereby liquified and issues from the individual fiber gaps with subsequent burning and blackening of the fibers, which leads to another constant temperature rise with final destruction of the plug.

In order that the heating of the reduced diameter proximal end of the plug caused by the light of the projector may be reduced, it has already been proposed to insert the proximal diametrically reduced plug section into a bore of an aluminium block including external cooling fins, in which the light source is present. The light is beamed into the end side of the plug via the bore as described in German Offenlegungsschrift No. 19 28 360. This measure has not proven entirely satisfactory in assuring either an adequate heat dissipation at the plug, or prevention of eye injuries by the high-intensity light emerging from the socket. Further, the application of cooling elements of this nature remains restricted to lamps of the proposed kind.

It is thus an object of the invention to minimize or prevent heat accumulation in the area of the light ingress into the plug and, in the case of light projectors of very high light output and comprising a connector socket for the plug of an optical fiber cable of optional cross-section. A second object consists in that a light emission by the projector should occur only when the cable plug is wholly inserted and secured in the connector socket, to prevent eye injuries during operation thereby.

SUMMARY OF THE INVENTION

In accordance with the invention, the first problem is resolved in the case of a light projector as hereinabove referred to, in that the cable plug inserted into the connector socket installed in an annular mounting and secured in its inserted position is enflanked at its diametrically reduced extremity by several, and preferably three, metal cooling jaws in the form of semi-cylindrical annular segments in contact with the same under radial inward spring loading, which may be thrust by a step of a thicker section of the plug coming into contact with shoulders of the cooling jaws against a spring system at an axial distance from the annular mounting of the connector socket.

This construction provides a secure contact of the cooling jaws against the periphery of the diametrically reduced plug section particularly exposed to the heat of radiation, and thereby a good cooling action and heat dissipation without appreciable heat transfer to the annular mounting and the connector socket. The cooling jaws are advantageously provided with radial cooling plates transferring heat to the environment, and the light ingress area of the plug at the proximal side, as well as the cooling jaws as such, are complementarily cooled by a directional cooling jet.

To resolve the other aforesaid problem, that is to say prevention of eye injuries, the procedure applied in accordance with the invention is such that the connector socket has an entraining element which entrains a pivot lever secured on the shaft upon twisting the socket, the shaft thereby pivoting a shutter out of the light beam of the projector, in which connection it is necessary however that it should be impossible to initiate this action until the plug has been wholly inserted into the connector socket and has been axially secured. The shutter thus remains in the beam path and can be pivoted out of the beam path only by twisting the connector socket bearing the inserted plug, into an axially secured position.

BRIEF DESCRIPTION OF THE DRAWINGS

In order that the invention may be more clearly understood, reference will now be made to the accompanying drawings which show one embodiment thereof by way of example and in which:

FIG. 1 shows an axial cross-section of the connector socket comprising cooling jaws, for the diametrically reduced plug section of an optical fiber cable, FIG. 1b shows an enlarged axial cross-section of the cooling jaws illustrated in FIG. 1, FIG. 2 shows an end view towards the cooling jaws, as seen from a line which extends between the connector socket comprising a ring mounting and the cooling jaws, without the plug member inserted into the cooling jaws, FIG. 3 shows the end view corresponding to FIG. 2, but with the diametrically reduced plug member inserted into the cooling jaws, FIG. 4 shows a cross-section along line IV—IV of FIG. 1 without the light conducting plug inserted into the socket, FIG. 5 shows the same cross-section as FIG. 4, but with the light conducting plug partially inserted, and FIG. 6 shows the same cross-section as FIG. 4, but with the light conducting plug wholly inserted, but without interlocking and without uncovering the beam path of the light projector.

DETAILED DESCRIPTION OF THE PREFERRED EMBODIMENT

Figure 1A:
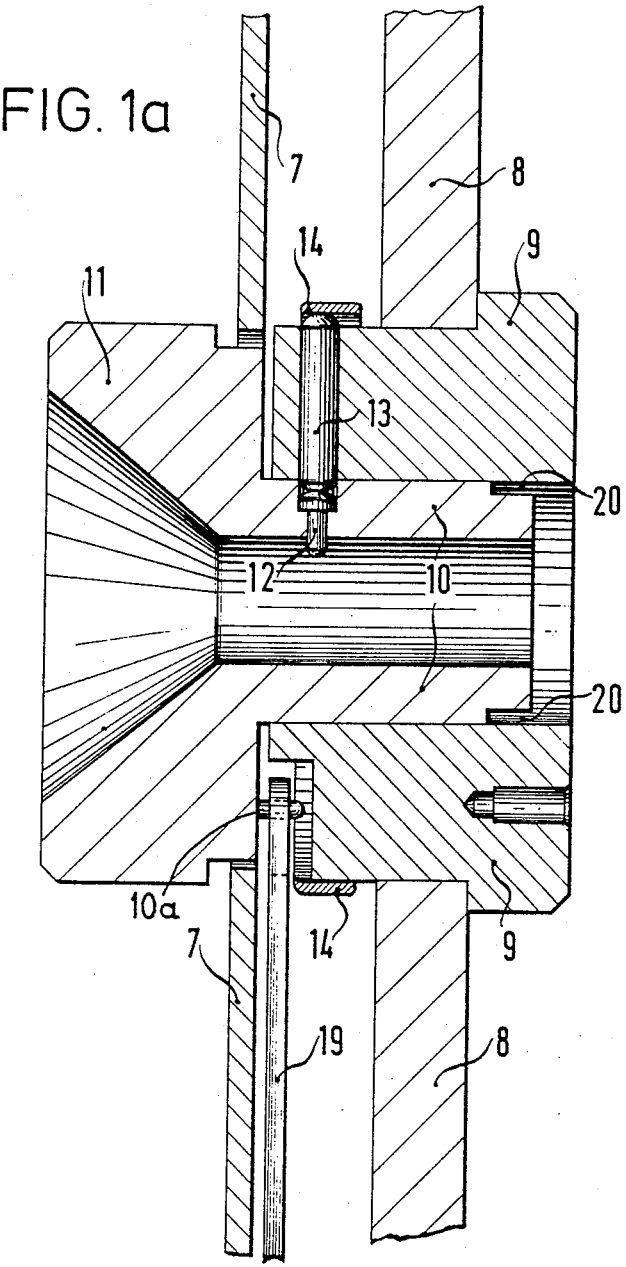
FIG. 1a shows an enlarged axial cross-section of the connector socket of FIG. 1 comprising a ring mounting.

Referring now to the drawings, as shown in FIG. 1, an optical fiber cable is provided at its end facing towards a light projector, with a plug 1 which is terminally formed with a diametrically reduced plug section 2 and the end face 2a of which has beamed into it the light of the projector. The plug section 2 merges via a step into a part 3 of greater diameter which is provided with an annular groove 4 for a reason hereinafter to be described. The fibers are firmly joined together by means of a glass bonder, at least in the area of the plug section 2 or 2a.

The condenser system of the light projector of high light output, comprising a connector socket and the mounting plate 5 receiving the condenser system is denoted by 6. The structure of light projectors is commonly known and therefore not illustrated in particular.

A cylindrical mounting 9 is fixedly secured behind the front panel 7 of the light projector in a bearer 8 and it, in turn, is adapted to receive a connector socket 10 which, in turn, is arranged to be rotatable to a limited degree within the mounting 9 by means of a grip ring 11 situated in front of the front panel 7.

A locking pin comprising two parts 12 and 13 (FIG. 1a) is located in radial bores of the mounting 9 and of the socket 10, which pin is biased radially inwards by an outer surrounding spring 14 and engages in axially locking manner in the annular groove 4 of the plug 1 when the latter is inserted into the socket 10. Upon inserting the plug 1, the two-piece or bipartite pin 12, 13 locking the socket 10 against twisting is displaced from the position according to FIGS. 1 and 4 into the position according to FIG. 5 by the diametrically enlarged plug section 3, in which the socket 10 is still locked against twisting in the ring mounting 9, until the pin element 12 can be engaged in the annular groove 4 of the plug 1 as illustrated in FIG. 6. In this position, the division of the locking pin 12, 13 is positioned precisely on the periphery of the socket 10 so that the latter may now be twisted by means of the grip 11. Twisting is limited in one direction in that the radial pin 15 of the ring mounting 9 engages in a peripheral groove 16 of the socket 10 and the momentary terminal position is indicated by touch detent elements 16a, the pin 15 preloaded in radial direction by the annular spring 14 engaging in notches 16a.

In the locked position of the socket 10 (FIGS. 1, 4 and 5), a shutter 17 known per se, which is fixedly arranged on a rotatable spring spindle 18, is situated in the beam path of the projector 6. This spindle 18 is connected to a lever arm 19 which is entrained by a stop 10a from the position of FIG. 6 during the rotation of the socket 10, and thereby pivots the shutter 17 out of the beam path of the projector via the spindle 18, which is thus possible only when the plug 1 has been wholly inserted into the socket 10.

At its extremity, the connector socket 10 is provided with an outer peripheral step 20 (FIGS. 1 and 1a) the periphery of which has three flats 21 (FIGS. 2 and 3). The one ends of axially parallel studs 22 which lie against the periphery of the step 20 (FIG. 2) if a plug 1 is not inserted, engage in the step 20. The other ends of the studs 22 are fixed in axial bores of three cooling jaws 23 which have a first mutual spacing when a plug 1 has not been inserted, as shown by FIG. 2, and which are biased radially inwards by a coil spring 24 extending around the periphery. These cooling jaws 23 bear with their surface turned towards the socket 10 against the annular mounting 9 in the initial position according to FIGS. 1 and 2, and this position is obtained by means of axially parallel screws 25 the ends of which are screwed into the annular mounting 9 and which pass with clearance through axially parallel bores 28 of the cooling jaws 23. The screws 25 are surrounded by a compression spring 27 bearing against an annular plate 28 traversed by the screws on the one hand, and on the other hand against an annular shoulder 29 of the cooling jaws 23 (see FIGS. 1 and 1b) and thereby establish contact of the cooling jaws 23 against the end face of the annular mounting 9.

When the plug 1 is inserted into the socket 10, the diametrically reduced plug section 2 passes into the internal space between the cooling jaws 23, whereas the plug section 3 fills the space in the socket 10. At the extremity turned towards the condenser system 6, the cooling jaws 23 have an inwardly directed annular shoulder 30 of low height, against which the end face 2a of the plug is placed in contact upon being inserted into the socket 10 and between the cooling jaws 23, and thereby displaces the cooling jaws 23 axially through a definite distance against the spring 27, until the locking pin 12, 13 engages in the annular groove 4 of the plug mounting 3. This forms a gap between the cooling jaws 23 and the end of the annular mounting 9, which prevents direct heat transfer between these parts 23 and 9,10. In this partially cancelled first locking position of the cooling jaws, the socket 10 may, as described with reference to FIGS. 1 and 4 to 6, be twisted into a second locking position by means of the grip 11, the plug 1 being immobilized in the socket 10, the shutter 17 being swung out of the beam path of the projector and the light being beamed into the optical fiber cable via the end face 2a. During this twisting operation, the axially parallel studs 22 simultaneously pass into the area of the flats 21 of the socket step 20 and the cooling jaws 23 may thereby have their inner areal sections placed wholly in contact with the periphery of the plug section 2 by the radially directed action of the annular spring 24 and the axial centering action by the plug section 2, so that the cooling jaws are able to draw off the heat generated particularly in this plug section by the high-intensity light beamed in an effective manner, which is promoted by the fact that the cooling jaws 23 are fitted with radially directed outer cooling plates 31, and also by the fact that the end face 2a of the plug section 2 and the adjacent areal parts of the cooling jaws 23 are impinged upon by a cooling air flow of a cooling air feed system 32. At the same time, the cooling jaws 23 assume a second smaller mutual spacing to assure an areal contact against the coupling section 2. Longitudinal differences of the plug sections 2, 3 may be balanced out by axial displacement of the socket 10.

I claim:

1. In a light projector of the kind comprising a condenser system and a shutter in front of a connector socket of a light conducting cable plug inserted into the same, the plug end of which plug at its proximal end adjacent the projector is reduced in diameter and is surrounded by a heat conductor, the improvement which consists in that the cable plug inserted into the connector socket installed in an annular mounting is enflanked at its diametrically reduced proximal end by a plurality of metal cooling jaws in the form of cylindrical annular segments in a radially inwardly spring-loaded manner and in contact therewith, which are thrustable against a spring system at an axial spacing from said connector socket and its said annular mounting by means of a step of a thicker section of said plug coming into contact against shoulders of said cooling jaws.

2. A light projector according to claim 1, wherein each said cooling jaw is provided with a cooling plate extending radially outwards.

3. A light projector according to claim 1, wherein a cooling air supply system is associated with said cooling jaws and is directed against said cooling jaws and an end face of said cable plug and is unaffected by tolerances and differences in shape of said plug and jaws.

4. A light projector according to claim 1, wherein means for securing said cable plug inserted into said connector socket comprise a two-piece pin spring-loaded radially inwardly and positioned within mateable radial bores in said annular mounting and said connector socket, wherein the inner pin section of said two-piece pin is receivable within an annular groove of said plug inserted into said socket and wherein, in this position, the point of separation of said two-piece pin is aligned with the outer periphery of said connector socket, provision being made for limited twisting of said connector socket.

5. A light projector according to claim 4, wherein the twisting of said connector socket in said annular mounting is delimited by a pin which is radially located in said annular mounting and engages by its inner end in a limited peripheral groove of said socket and said delimiting pin engages in notches for the terminal positions of said connector socket.

6. A light projector according to claim 4 wherein said connector socket has an entraining element which, during the twisting action performed on said socket, entrains a pivot lever secured on an axially parallel spindle, while said spindle pivots a shutter secured to it out of the light beam of the projector.

7. A light projector according to claim 1, wherein the end of said connector socket adjacent said condenser system and provided with peripheral flats is stepped in its thickness at the external periphery and said step is enflanked by said annular mounting and receives the one ends of entraining studs the other ends of which are secured in axially parallel bores of said cooling jaws held together in the radial direction by an enflanking traction spring, said jaws being axially preloaded by compression springs in the direction towards the end face of said annular mounting.

8. A light projector according to claim 1, wherein axially parallel screws pass through bores of said cooling jaws with clearance, a coil spring surrounding each screw, said screws have one end screwable into said annular mounting of said socket and said screws pass through an annular plate which is connected to said cooling jaws and acts as a counterabutment for the one end of each coil spring surrounding said screws, the other counterabutment of which consists of an annular shoulder of said cooling jaws terminating said bores.

9. A light projector according to claim 1, which includes an air supply pipe which is directed against said cooling jaws and an end face of said cable plug.

10. A light projector according to claim 1, wherein means for securing said cable plug inserted into said connector socket comprise a bipartite pin spring-loaded radially inwardly and positioned within mateable radial bores in said annular mounting and said connector socket, wherein an inner pin part of said bipartite pin is receivable within an annular groove of said plug inserted into said socket and wherein, in this position, the point of separation of said bipartite pin is aligned with the outer periphery of said connector socket, whereby a limited twisting of said connector socket is allowed.

11. A light projector according to claim 1, wherein said connector socket is twistable a limited amount in the annular mounting by means of a pin being radially guided in the annular mounting and having an inner end engageable in a limited peripheral groove of said socket, said groove having notches for the terminal positions of said connector socket.

12. A light projector according to claim 1, wherein said connector socket has an entraining element which, during a twisting action of said socket, entrains a pivot lever secured on an axially parallel spindle, which pivots a shutter secured to it out of the light beam of the projector.

13. In an optical fiber light projecting system including a condenser system, an optical fiber plug connector socket adapted to receive at least a portion of the cylindrical plug end of an optical fiber bundle, the improvement comprising a plurality of radially moveable cooling jaws adjacent said connector socket and adapted to engage said plug end of an optical fiber bundle inserted into said connector socket, means biasing said cooling jaws into engagement with said plug end, whereby plug ends of different diameters can be contacted by said cooling jaws.

14. An optical fiber light projecting system constructed in accordance with claim 13 and including a shutter disposed in the light path between said condenser system and said plug end situated within said optical fiber plug connector socket, the further improvement comprising means fixedly securing said plug end within said socket and coincidentally with said fixed securement, maintaining said shutter out of the light path between said condenser system and said plug end.

15. An optical fiber light projecting system constructed in accordance with claim 13 wherein each said cooling jaw is provided with at least one cooling plate extending radially outwardly of the plug end receiving axis of said cooling jaw.

16. An optical fiber light projecting system constructed in accordance with claim 13 and further comprising a cooling air supply system associated with said cooling jaws and said plug end received within said jaws for directing cooling air to said jaws and said plug end.

* * * * *